(12) United States Patent
Graehl et al.

(10) Patent No.: US 7,698,125 B2
(45) Date of Patent: Apr. 13, 2010

(54) TRAINING TREE TRANSDUCERS FOR PROBABILISTIC OPERATIONS

(75) Inventors: Jonathan Graehl, Playa del Rey, CA (US); Kevin Knight, Hermosa Beach, CA (US)

(73) Assignee: Language Weaver, Inc., Los Angeles, CA (US)

( * ) Notice: Subject to any disclaimer, the term of this patent is extended or adjusted under 35 U.S.C. 154(b) by 1429 days.

(21) Appl. No.: 11/082,216

(22) Filed: Mar. 15, 2005

(65) Prior Publication Data

US 2005/0234701 A1 Oct. 20, 2005

Related U.S. Application Data

(60) Provisional application No. 60/553,587, filed on Mar. 15, 2004.

(51) Int. Cl.
*G06F 17/28* (2006.01)

(52) U.S. Cl. ............................. 704/5; 704/9

(58) Field of Classification Search ............ 704/5, 704/9, 254, 255
See application file for complete search history.

(56) References Cited

U.S. PATENT DOCUMENTS

| | | | |
|---|---|---|---|
| 4,502,128 A | 2/1985 | Okajima et al. |
| 4,599,691 A | 7/1986 | Sakaki et al. |
| 4,787,038 A | 11/1988 | Doi et al. |
| 4,814,987 A | 3/1989 | Miyao et al. |
| 4,942,526 A | 7/1990 | Okajima et al. |
| 5,146,405 A | 9/1992 | Church |
| 5,181,163 A | 1/1993 | Nakajima et al. |
| 5,212,730 A | 5/1993 | Wheatley et al. |
| 5,267,156 A | 11/1993 | Nomiyama |
| 5,311,429 A | 5/1994 | Tominaga |
| 5,432,948 A | 7/1995 | Davis et al. |
| 5,477,451 A | 12/1995 | Brown et al. |
| 5,510,981 A | 4/1996 | Berger et al. |
| 5,644,774 A | 7/1997 | Fukumochi et al. |
| 5,696,980 A | 12/1997 | Brew |
| 5,724,593 A | 3/1998 | Hargrave, III et al. |
| 5,761,631 A | 6/1998 | Nasukawa |
| 5,781,884 A | 7/1998 | Pereira et al. |
| 5,805,832 A | 9/1998 | Brown et al. |

(Continued)

FOREIGN PATENT DOCUMENTS

EP    0469884 A2    2/1992

(Continued)

OTHER PUBLICATIONS

Alshawi, Hiyan, "Head Automata for Speech Translation", Proceedings of the ICSLP 96, 1996, Philadelphia, Pennsylvania.

(Continued)

*Primary Examiner*—Michael N Opsasnick
(74) *Attorney, Agent, or Firm*—Carr & Ferrell LLP

(57) ABSTRACT

Tree transducers can be trained for use in probabilistic operations such as those involved in statistical based language processing. Given sample input/output pairs as training, and given a set of tree transducer rules, the information is combined to yield locally optimal weights for those rules. This combination is carried out by building a weighted derivation forest for each input/output pair and applying counting methods to those forests.

23 Claims, 5 Drawing Sheets

| original order | reordering | P(reorder) |
|---|---|---|
| PRP VB1 VB2 | PRP VB1 VB2 | 0.074 |
| | PRP VB2 VB1 | 0.723 |
| | VB1 PRP VB2 | 0.061 |
| | VB1 VB2 PRP | 0.037 |
| | VB2 PRP VB1 | 0.083 |
| | VB2 VB1 PRP | 0.021 |
| VB TO | VB TO | 0.251 |
| | TO VB | 0.749 |
| TO NN | TO NN | 0.107 |
| | NN TO | 0.893 |
| ⋮ | ⋮ | ⋮ | r-table

| parent | TOP | VB | VB | VB | TO | TO | ... |
|---|---|---|---|---|---|---|---|
| node | VB | VB | PRP | TO | TO | NN | ... |
| P(None) | 0.735 | 0.687 | 0.344 | 0.709 | 0.900 | 0.800 | ... |
| P(Left) | 0.004 | 0.061 | 0.004 | 0.030 | 0.003 | 0.096 | ... |
| P(Right) | 0.260 | 0.252 | 0.652 | 0.261 | 0.007 | 0.104 | ... | n-table

| w | P(ins-w) |
|---|---|
| ha | 0.219 |
| ta | 0.131 |
| wo | 0.099 |
| no | 0.094 |
| ni | 0.080 |
| te | 0.078 |
| ga | 0.062 |
| ⋮ | ⋮ |
| desu | 0.0007 |
| ⋮ | ⋮ |

| E | adores | | he | | i | | listening | | music | | to | |
|---|---|---|---|---|---|---|---|---|---|---|---|---|
| J | daisuki | 1.000 | kare | 0.952 | NULL | 0.471 | kiku | 0.333 | ongaku | 0.900 | ni | 0.216 |
| | | | NULL | 0.016 | watasi | 0.111 | kii | 0.333 | naru | 0.100 | NULL | 0.204 |
| | | | nani | 0.005 | kare | 0.055 | mi | 0.333 | | | to | 0.133 |
| | | | da | 0.003 | shi | 0.021 | | | | | no | 0.046 |
| | | | shi | 0.003 | nani | 0.020 | | | | | wo | 0.038 |
| | | | ⋮ | | ⋮ | | | | | | ⋮ | | t-table

U.S. PATENT DOCUMENTS

| | | | |
|---|---|---|---|
| 5,806,032 A * | 9/1998 | Sproat | 704/255 |
| 5,848,385 A | 12/1998 | Poznanski et al. | |
| 5,867,811 A | 2/1999 | O'Donoghue | |
| 5,870,706 A | 2/1999 | Alshawi | |
| 5,903,858 A | 5/1999 | Saraki | |
| 5,987,404 A | 11/1999 | Della Pietra et al. | |
| 5,991,710 A | 11/1999 | Papineni et al. | |
| 6,031,984 A | 2/2000 | Walser | |
| 6,032,111 A | 2/2000 | Mohri | |
| 6,092,034 A | 7/2000 | McCarley et al. | |
| 6,119,077 A | 9/2000 | Shinozaki | |
| 6,131,082 A | 10/2000 | Hargrave, III et al. | |
| 6,182,014 B1 | 1/2001 | Kenyon et al. | |
| 6,205,456 B1 | 3/2001 | Nakao | |
| 6,223,150 B1 | 4/2001 | Duan et al. | |
| 6,236,958 B1 | 5/2001 | Lange et al. | |
| 6,278,967 B1 | 8/2001 | Akers et al. | |
| 6,285,978 B1 | 9/2001 | Bernth et al. | |
| 6,289,302 B1 | 9/2001 | Kuo | |
| 6,304,841 B1 | 10/2001 | Berger et al. | |
| 6,311,152 B1 | 10/2001 | Bai et al. | |
| 6,360,196 B1 | 3/2002 | Poznanski et al. | |
| 6,389,387 B1 | 5/2002 | Poznanski et al. | |
| 6,393,388 B1 | 5/2002 | Franz et al. | |
| 6,393,389 B1 | 5/2002 | Chanod et al. | |
| 6,415,250 B1 | 7/2002 | van den Akker | |
| 6,460,015 B1 | 10/2002 | Hetherington et al. | |
| 6,502,064 B1 | 12/2002 | Miyahira et al. | |
| 6,587,844 B1 * | 7/2003 | Mohri | 706/20 |
| 6,782,356 B1 | 8/2004 | Lopke | |
| 6,810,374 B2 | 10/2004 | Kang | |
| 6,904,402 B1 | 6/2005 | Wang et al. | |
| 7,013,262 B2 * | 3/2006 | Tokuda et al. | 704/9 |
| 7,107,215 B2 | 9/2006 | Ghali | |
| 7,113,903 B1 | 9/2006 | Riccardi et al. | |
| 7,143,036 B2 * | 11/2006 | Weise | 704/245 |
| 7,149,688 B2 * | 12/2006 | Schalkwyk | 704/255 |
| 7,346,493 B2 * | 3/2008 | Ringger et al. | 704/9 |
| 7,373,291 B2 * | 5/2008 | Garst | 704/4 |
| 7,389,234 B2 * | 6/2008 | Schmid et al. | 704/270.1 |
| 2002/0188438 A1 | 12/2002 | Knight et al. | |
| 2002/0198701 A1 | 12/2002 | Moore | |
| 2004/0015342 A1 * | 1/2004 | Garst | 704/5 |
| 2004/0030551 A1 | 2/2004 | Marcu et al. | |
| 2004/0111253 A1 * | 6/2004 | Luo et al. | 704/4 |
| 2004/0193401 A1 * | 9/2004 | Ringger et al. | 704/9 |
| 2005/0125218 A1 * | 6/2005 | Rajput et al. | 704/8 |

FOREIGN PATENT DOCUMENTS

| | | |
|---|---|---|
| EP | 0715265 A2 | 6/1996 |
| EP | 0933712 A2 | 8/1999 |
| JP | 07244666 | 1/1995 |
| JP | 10011447 | 1/1998 |
| JP | 11272672 | 10/1999 |

OTHER PUBLICATIONS

Mohri, Mehryar, "Regular Approximation of Context-Free Grammars Through Transformation", 2000, pp. 251-261, "Robustness in Language and Speech Technology", Chapter 9, Kluwer Academic Publishers.

Norvig, Peter, "Techniques for Automatic Memoization with Applications to Context-Free Parsing", Computational Linguistics, 1991, pp. 91-98, vol. 17, No. 1.

Abney, Stephen, "Parsing by Chunks," 1991, Principle-Based Parsing: Computation and Psycholinguistics, vol. 44, pp. 257-279.

Al-Onaizan et al., "Statistical Machine Translation," 1999, JHU Summer Tech Workshop, Final Report, pp. 1-42.

Al-Onaizan, Y. and Knight, K., "Named Entity Translation: Extended Abstract" 2002, Proceedings of HLT-02, San Diego, CA.

Al-Onaizan, Y. and Knight, K., "Translating Named Entities Using Monolingual and Bilingual Resources," 2002, Proc. of the 40th Annual Meeting of the ACL,pp. 400-408.

Al-Onaizan et al., "Translating with Scarce Resources," 2000, 17th National Conference of the American Association for Artificial Intelligence, Austin, TX, pp. 672-678.

Alshawi et al., "Learning Dependency Translation Models as Collections of Finite-State Head Transducers," 2000, Computational Linguistics, vol. 26, pp. 45-60.

Arbabi et al., "Algorithms for Arabic name transliteration," Mar. 1994, IBM Journal of Research and Development, vol. 38, Issue 2, pp. 183-194.

Barnett et al., "Knowledge and Natural Language Processing," Aug. 1990, Communications of the ACM, vol. 33, Issue 8, pp. 50-71.

Bangalore, S. and Rambow, O., "Corpus-Based Lexical Choice in Natural Generation," 2000, Proc. of the 38th Annual ACL, Hong Kong, pp. 464-471.

Bangalore, S. and Rambow, O., "Exploiting a Probabilistic Hierarchical Model for Generation," 2000, Proc. of 18th conf. on Computational Linguistics, vol. 1, pp. 42-48.

Bangalore, S. and Rambow, O., "Evaluation Metrics for Generation," 2000, Proc. of the 1st International Natural Language Generation Conf., vol. 14, p. 1-8.

Bangalore, S. and Rambow, O., "Using TAGs, a Tree Model, and a Language Model for Generation," May 2000, Workshop TAG+5, Paris.

Baum, Leonard, "An Inequality and Associated Maximization Technique in Statistical Estimation for Probabilistic Functions of Markov Processes", 1972, Inequalities 3:1-8.

Bikel et al., "An Algorithm that Learns What's in a Name," 1999, Machine Learning Journal Special Issue on Natural Language Learning, vol. 34, pp. 211-232.

Brants, Thorsten, "TnT—A Statistical Part-of-Speech Tagger," 2000, Proc. of the 6th Applied Natural Language Processing Conference, Seattle.

Brill, Eric. "Transformation-Based Error-Driven Learning and Natural Language Processing: A Case Study in Part of Speech Tagging", 1995, Computational Linguistics, vol. 21, No. 4, pp. 543-565.

Brown et al., "A Statistical Approach to Machine Translation," Jun. 1990, Computational Linguistics, vol. 16, No. 2, pp. 79-85.

Brown, Ralf, "Automated Dictionary Extraction for "Knowledge-Free" Example-Based Translation," 1997, Proc. of 7th Int'l Conf. on Theoretical and Methodological Issues in MT, Santa Fe, NM, pp. 111-118.

Brown et al., "The Mathematics of Statistical Machine Translation: Parameter Estimation," 1993, Computational Linguistics, vol. 19, Issue 2, pp. 263-311.

Brown et al., "Word-Sense Disambiguation Using Statistical Methods," 1991, Proc. of 29th Annual ACL, pp. 264-270.

Carl, Michael. "A Constructivist Approach to Machine Translation," 1998, New Methods of Language Processing and Computational Natural Language Learning, pp. 247-256.

Chen, K. and Chen, H., "Machine Translation: An Integrated Approach," 1995, Proc. of 6th Int'l Conf. on Theoretical and Methodological Issue in MT, pp. 287-294.

Chinchor, Nancy, "MUC-7 Named Entity Task Definition," 1997, Version 3.5.

Clarkson, P. and Rosenfeld, R., "Statistical Language Modeling Using the CMU-Cambridge Toolkit", 1997, Proc. ESCA Eurospeech, Rhodes, Greece, pp. 2707-2710.

Corston-Oliver, Simon, "Beyond String Matching and Cue Phrases: Improving Efficiency and Coverage in Discourse Analysis",1998, The AAAI Spring Symposium on Intelligent Text Summarization, pp. 9-15.

Dagan, I. and Itai, A., "Word Sense Disambiguation Using a Second Language Monolingual Corpus", 1994, Computational Linguistics, vol. 20, No. 4, pp. 563-596.

Dempster et al., "Maximum Likelihood from Incomplete Data via the EM Algorithm", 1977, Journal of the Royal Statistical Society, vol. 39, No. 1, pp. 1-38.

Diab, M. and Finch, S., "A Statistical Word-Level Translation Model for Comparable Corpora," 2000, In Proc.of the Conference on ContentBased Multimedia Information Access (RIAO).

Elhadad, M. and Robin, J., "An Overview of SURGE: a Reusable Comprehensive Syntactic Realization Component," 1996, Technical Report Mar. 1996, Department of Mathematics and Computer Science, Ben Gurion University, Beer Sheva, Israel.

Elhadad, M. and Robin, J., "Controlling Content Realization with Functional Unification Grammars", 1992, Aspects of Automated Natural Language Generation, Dale et al. (eds)., Springer Verlag, pp. 89-104.

Elhadad et al., "Floating Constraints in Lexical Choice", 1996, ACL, 23(2): 195-239.

Elhadad, Michael, "FUF: the Universal Unifier User Manual Version 5.2", 1993, Department of Computer Science, Ben Gurion University, Beer Sheva, Israel.

Elhadad. M. and Robin, J., "SURGE: a Comprehensive Plug-in Syntactic Realization Component for Text Generation", 1999 (available at http://www.cs.bgu.ac.il/~elhadad/pub.html).

Elhadad, Michael, "Using Argumentation to Control Lexical Choice: A Functional Unification Implementation", 1992, Ph.D. Thesis, Graduate School of Arts and Sciences, Columbia University.

Fung, Pascale, "Compiling Bilingual Lexicon Entries From a Non-Parallel English-Chinese Corpus", 1995, Proc. of the Third Workshop on Very Large Corpora, Boston, MA, pp. 173-183.

Fung, P. and Yee, L., "An IR Approach for Translating New Words from Nonparallel, Comparable Texts", 1998, 36th Annual Meeting of the ACL, 17th International Conference on Computational Linguistics, pp. 414-420.

Gale, W. and Church, K., "A Program for Aligning Sentences in Bilingual Corpora," 1991, 29th Annual Meeting of the ACL, pp. 177-183.

Germann, Ulrich, "Building a Statistical Machine Translation System from Scratch: How Much Bang for the Buck Can We Expect?" Proc. of the Data-Driven MT Workshop of ACL-01, Toulouse, France, 2001.

Germann et al., "Fast Decoding and Optimal Decoding for Machine Translation", 2001, Proc. of the 39th Annual Meeting of the ACL, Toulouse, France, pp. 228-235.

Diab, Mona, "An Unsupervised Method for Multilingual Word Sense Tagging Using Parallel Corpora: A Preliminary Investigation", 2000, SIGLEX Workshop on Word Senses and Multi-Linguality, pp. 1-9.

Grefenstette, Gregory, "The World Wide Web as a Resource for Example-Based Machine Translation Tasks", 1999, Translating and the Computer 21, Proc. of the 21st International Conf. on Translating and the Computer, London, UK, 12 pp.

Hatzivassiloglou, V. et al., "Unification-Based Glossing", 1995, Proc. of the International Joint Conference on Artificial Intelligence, pp. 1382-1389.

Ide, N. and Veronis, J., "Introduction to the Special Issue on Word Sense Disambiguation: The State of the Art", Mar. 1998, Computational Linguistics, vol. 24, Issue 1, pp. 2-40.

Imamura, Kenji, "Hierarchical Phrase Alignment Harmonized with Parsing", 2001, in Proc. of NLPRS, Tokyo.

Jelinek, F., "Fast Sequential Decoding Algorithm Using a Stack", Nov. 1969, IBM J. Res. Develop., vol. 13, No. 6, pp. 675-685.

Jones, K. Sparck, "Experiments in Relevance Weighting of Search Terms", 1979, Information Processing & Management, vol. 15, Pergamon Press Ltd., UK, pp. 133-144.

Knight, K. and Yamada, K., "A Computational Approach to Deciphering Unknown Scripts," 1999, Proc. of the ACL Workshop on Unsupervised Learning in Natural Language Processing.

Knight, K. and Al-Onaizan, Y., "A Primer on Finite-State Software for Natural Processing", 1999 (available at http://www.isi.edu/licensed-sw/carmel).

Knight, Kevin, "A Statistical MT Tutorial Workbook," 1999, JHU Summer Workshop (available at http://www.isi.edu/natural-language/mt/wkbk.rtf).

Knight, Kevin, "Automating Knowledge Acquisition for Machine Translation," 1997, AI Magazine 18(4).

Knight, K. and Chander, I., "Automated Postediting of Documents,"1994, Proc. of the 12th Conference on Artificial Intelligence, pp. 779-784.

Knight, K. and Luk, S., "Building a Large-Scale Knowledge Base for Machine Translation," 1994, Proc. of the 12th Conference on Artificial Intelligence, pp. 773-778.

Knight, Kevin, "Connectionist Ideas and Algorithms," Nov. 1990, Communications of the ACM, vol. 33, No. 11, pp. 59-74.

Knight, Kevin, "Decoding Complexity in Word-Replacement Translation Models", 1999, Computational Linguistics, 25(4).

Knight et al., "Filling Knowledge Gaps in a Broad-Coverage Machine Translation System", 1995, Proc. of the 14th International Joint Conference on Artificial Intelligence, Montreal, Canada, vol. 2, pp. 1390-1396.

Knight, Kevin, "Integrating Knowledge Acquisition and Language Acquisition," May 1992, Journal of Applied Intelligence, vol. 1, No. 4.

Knight et al., "Integrating Knowledge Bases and Statistics in MT," 1994, Proc. of the Conference of the Association for Machine Translation in the Americas.

Knight, Kevin, "Learning Word Meanings by Instruction,"1996, Proc. of the National Conference on Artificial Intelligence, vol. 1, pp. 447-454.

Knight, K. and Graehl, J., "Machine Transliteration", 1997, Proc. of the ACL-97, Madrid, Spain.

Knight, K. et al., "Machine Transliteration of Names in Arabic Text," 2002, Proc. of the ACL Workshop on Computational Approaches to Semitic Languages.

Knight, K. and Marcu, D., "Statistics-Based Summarization—Step One: Sentence Compression," 2000, American Association for Artificial Intelligence Conference, pp. 703-710.

Knight et al., "Translation with Finite-State Devices," 1998, Proc. of the 3rd AMTA Conference, pp. 421-437.

Knight, K. and Hatzivassiloglou, V., "Two-Level, Many-Paths Generation," 1995, Proc. of the 33rd Annual Conference of the ACL, pp. 252-260.

Knight, Kevin, "Unification: A Multidisciplinary Survey," 1989, ACM Computing Surveys, vol. 21, No. 1.

Koehn, P. and Knight, K., "ChunkMT: Statistical Machine Translation with Richer Linguistic Knowledge," Apr. 2002, Information Sciences Institution.

Koehn, P. and Knight, K., "Estimating Word Translation Probabilities from Unrelated Monolingual Corpora Using the EM Algorithm," 2000, Proc. of the 17th meeting of the AAAI.

Koehn, P. and Knight, K., "Knowledge Sources for Word-Level Translation Models," 2001, Conference on Empirical Methods in Natural Language Processing.

Kurohashi, S. and Nagao, M., "Automatic Detection of Discourse Structure by Checking Surface Information in Sentences," 1994, Proc. of COL-LING '94, vol. 2, pp. 1123-1127.

Langkilde-Geary, Irene, "An Empirical Verification of Coverage and Correctness for a General-Purpose Sentence Generator," 1998, Proc. 2nd Int'l Natural Language Generation Conference.

Langkilde-Geary, Irene, "A Foundation for General-Purpose Natural Language Generation: Sentence Realization Using Probabilistic Models of Language," 2002, Ph.D. Thesis, Faculty of the Graduate School, University of Southern California.

Langkilde, Irene, "Forest-Based Statistical Sentence Generation," 2000, Proc. of the 1st Conference on North American chapter of the ACL, Seattle, WA, pp. 170-177.

Langkilde, I. and Knight, K., "The Practical Value of N-Grams in Generation," 1998, Proc. of the 9th International Natural Language Generation Workshop, p. 248-255.

Langkilde, I. and Knight, K., "Generation that Exploits Corpus-Based Statistical Knowledge," 1998, Proc. of the COLING-ACL, pp. 704-710.

Mann, G. and Yarowsky, D., "Multipath Translation Lexicon Induction via Bridge Languages," 2001, Proc. of the 2nd Conference of the North American Chapter of the ACL, Pittsburgh, PA, pp. 151-158.

Manning, C. and Schutze, H., "Foundations of Statistical Natural Language Processing," 2000, The MIT Press, Cambridge, MA [redacted].

Marcu, D. and Wong, W., "A Phrase-Based, Joint Probability Model for Statistical Machine Translation," 2002, Proc. of ACL-2 conference on Empirical Methods in Natural Language Processing, vol. 10, pp. 133-139.

Marcu, Daniel, "Building Up Rhetorical Structure Trees," 1996, Proc. of the National Conference on Artificial Intelligence and Innovative Applications of Artificial Intelligence Conference, vol. 2, pp. 1069-1074.

Marcu, Daniel, "Discourse trees are good indicators of importance in text," 1999, Advances in Automatic Text Summarization, The MIT Press, Cambridge, MA.

Marcu, Daniel, "Instructions for Manually Annotating the Discourse Structures of Texts," 1999, Discourse Annotation, pp. 1-49.

Marcu, Daniel, "The Rhetorical Parsing of Natural Language Texts," 1997, Proceedings of ACL/EACL '97, pp. 96-103.

Marcu, Daniel, "The Rhetorical Parsing, Summarization, and Generation of Natural Language Texts," 1997, Ph.D. Thesis, Graduate Department of Computer Science, University of Toronto.

Marcu, Daniel, "Towards a Unified Approach to Memory- and Statistical-Based Machine Translation," 2001, Proc. of the 39th Annual Meeting of the ACL, pp. 378-385.

Melamed, I. Dan, "A Word-to-Word Model of Translational Equivalence," 1997, Proc. of the 35th Annual Meeting of the ACL, Madrid, Spain, pp. 490-497.

Melamed, I. Dan, "Automatic Evaluation and Uniform Filter Cascades for Inducing N-Best Translation Lexicons," 1995, Proc. of the 3rd Workshop on Very Large Corpora, Boston, MA, pp. 184-198.

Melamed, I. Dan, "Empirical Methods for Exploiting Parallel Texts," 2001, MIT Press, Cambridge, MA [table of contents].

Meng et al., "Generating Phonetic Cognates to Handle Named Entities in English-Chinese Cross-Language Spoken Document Retrieval," 2001, IEEE Workshop on Automatic Speech Recognition and Understanding, pp. 311-314.

Miike et al., "A full-text retrieval system with a dynamic abstract generation function," 1994, Proceedings of SI-GIR '94, pp. 152-161.

Mikheev et al., "Named Entity Recognition without Gazeteers," 1999, Proc. of European Chapter of the ACL, Bergen, Norway, pp. 1-8.

Monasson et al., "Determining computational complexity from characteristic 'phase transitions'," Jul. 1999, Nature Magazine, vol. 400, pp. 133-137.

Mooney, Raymond, "Comparative Experiments on Disambiguating Word Senses: An Illustration of the Role of Bias in Machine Learning," 1996, Proc. of the Conference on Empirical Methods in Natural Language Processing, pp. 82-91.

Niessen, S. and Ney, H, "Toward hierarchical models for statistical machine translation of inflected languages," 2001, Data-Driven Machine Translation Workshop, Toulouse, France, pp. 47-54.

Och, F. and Ney, H, "Improved Statistical Alignment Models," 2000, 38th Annual Meeting of the ACL, Hong Kong, pp. 440-447.

Och et al., "Improved Alignment Models for Statistical Machine Translation," 1999, Proc. of the Joint Conf. of Empirical Methods in Natural Language Processing and Very Large Corpora, pp. 20-28.

Papineni et al., "Bleu: a Method for Automatic Evaluation of Machine Translation," 2001, IBM Research Report, RC22176(WO102-022).

Pla et al., "Tagging and Chunking with Bigrams," 2000, Proc. of the 18th Conference on Computational Linguistics, vol. 2, pp. 614-620.

Rapp, Reinhard, Automatic Identification of Word Translations from Unrelated English and German Corpora, 1999, 37th Annual Meeting of the ACL, pp. 519-526.

Rapp, Reinhard, "Identifying Word Translations in Non-Parallel Texts," 1995, 33rd Annual Meeting of the ACL, pp. 320-322.

Resnik, P. and Yarowsky, D., "A Perspective on Word Sense Disambiguation Methods and Their Evaluation," 1997, Proceedings of SIGLEX '97, Washington, DC, pp. 79-86.

Resnik, Philip, "Mining the Web for Bilingual Text," 1999, 37th Annual Meeting of the ACL, College Park, MD, pp. 527-534.

Rich, E. and Knight, K., "Artificial Intelligence, Second Edition," 1991, McGraw-Hill Book Company [redacted].

Richard et al., "Visiting the Traveling Salesman Problem with Petri nets and application in the glass industry," Feb. 1996, IEEE Emerging Technologies and Factory Automation, pp. 238-242.

Robin, Jacques, "Revision-Based Generation of Natural Language Summaries Providing Historical Background: Corpus-Based Analysis, Design Implementation and Evaluation," 1994, Ph.D. Thesis, Columbia University, New York.

Sang, E. and Buchholz, S., "Introduction to the CoNLL-2000 Shared Task: Chunking," 20002, Proc. of CoNLL-2000 and LLL-2000, Lisbon, Portugal, pp. 127-132.

Schmid, H., and Walde, S., "Robust German Noun Chunking With a Probabilistic Context-Free Grammar," 2000, Proc. of the 18th Conference on Computational Linguistics, vol. 2, pp. 726-732.

Selman et al., "A New Method for Solving Hard Satisfiability Problems," 1992, Proc. of the 10th National Conference on Artificial Intelligence, San Jose, CA, pp. 440-446.

Schutze, Hinrich, "Automatic Word Sense Discrimination," 1998, Computational Linguistics, Special Issue on Word Sense Disambiguation, vol. 24, Issue 1, pp. 97-123.

Sobashima et al., "A Bidirectional Transfer-Driven Machine Translation System for Spoken Dialogues," 1994, Proc. of 15th Conference on Computational Linguistics, vol. 1, pp. 64-68.

Shapiro, Stuart (ed.), "Encyclopedia of Artificial Intelligence, 2nd edition", vol. 2, 1992, John Wiley & Sons Inc; "Unification" article, K. Knight, pp. 1630-1637.

Soricut et al., "Using a large monolingual corpus to improve translation accuracy," 2002, Lecture Notes in Computer Science, vol. 2499, Proc. of the 5th Conference of the Association for Machine Translation in the Americas on Machine Translation: From Research to Real Users, pp. 155-164.

Stalls, B. and Knight, K., "Translating Names and Technical Terms in Arabic Text," 1998, Proc. of the COLING/ACL Workkshop on Computational Approaches to Semitic Language.

Sun et al., "Chinese Named Entity Identification Using Class-based Language Model," 2002, Proc. of 19th International Conference on Computational Linguistics, Taipei, Taiwan, vol. 1, pp. 1-7.

Sumita et al., "A Discourse Structure Analyzer for Japanese Text," 1992, Proc. of the International Conference on Fifth Generation Computer Systems, vol. 2, pp. 1133-1140.

Taylor et al., "The Penn Treebank: An Overview," in A. Abeill (ed.), Treebanks: Building and Using Parsed Corpora, 2003, pp. 5-22.

Tiedemann, Jorg, "Automatic Construction of Weighted String Similarity Measures," 1999, In Proceedings of the Joint SIGDAT Conference on Emperical Methods in Natural Language Processing and Very Large Corpora.

Tillmann et al., "A DP based Search Using Monotone Alignments in Statistical Translation," 1997, Proc. of the Annual Meeting of the ACL, pp. 366-372.

Tillman, C. and Xia, F., "A Phrase-Based Unigram Model for Statistical Machine Translation," 2003, Proc. of the North American Chapter of the ACL on Human Language Technology, vol. 2, pp. 106-108.

Veale, T. and Way, A., "Gaijin: A Bootstrapping, Template-Driven Approach to Example-Based MT," 1997, Proc. of New Methods in Natural Language Processing (NEMPLP97), Sofia, Bulgaria.

Vogel, S. and Ney, H., "Construction of a Hierarchical Translation Memory," 2000, Proc. of Cooling 2000, Saarbrucken, Germany, pp. 1131-1135.

Vogel et al., "The CMU Statistical Machine Translation System," 2003, Machine Translation Summit IX, New Orleans, LA.

Vogel et al., "The Statistical Translation Module in the Verbmobil System," 2000, Workshop on Multi-Lingual Speech Communication, pp. 69-74.

Wang, Ye-Yi, "Grammar Interference and Statistical Machine Translation," 1998, Ph.D Thesis, Carnegie Mellon University, Pittsburgh, PA.

Watanbe et al., "Statistical Machine Translation Based on Hierarchical Phrase Alignment," 2002, 9th International Conference on Theoretical and Methodological Issues in Machin Translation (TMI-2002), Keihanna, Japan, pp. 188-198.

Witbrock, M. and Mittal, V., "Ultra-Summarization: A Statistical Approach to Generating Highly Condensed Non-Extractive Summaries," 1999, Proc. of SIGIR '99, 22nd International Conference on Research and Development in Information Retrieval, Berkeley, CA, pp. 315-316.

Wang, Y. and Waibel, A., "Decoding Algorithm in Statistical Machine Translation," 1996, Proc. of the 35th Annual Meeting of the ACL, pp. 366-372.

Wu, Dekai, "Stochastic Inversion Transduction Grammars and Bilingual Parsing of Parallel Corpora," 1997, Computational Linguistics, vol. 23, Issue 3, pp. 377-403.

Wu, Dekai, "A Polynomial-Time Algorithm for Statistical Machine Translation," 1996, Proc. of 34th Annual Meeting of the ACL, pp. 152-158.

Yamada, K. and Knight, K., "A Decoder for Syntax-based Statistical MT," 2001, Proceedings of the 40th Annual Meeting of the ACL, pp. 303-310.

Yamada, K. and Knight, K. "A Syntax-based Statistical Translation Model," 2001, Proc. of the 39th Annual Meeting of the ACL, pp. 523-530.

Yamamoto et al., "A Comparative Study on Translation Units for Bilingual Lexicon Extraction," 2001, Japan Academic Association for Copyright Clearance, Tokyo, Japan.

Yarowsky, David, "Unsupervised Word Sense Disambiguation Rivaling Supervised Methods," 1995, 33rd Annual Meeting of the ACL, pp. 189-196.

Callan et al., "TREC and TIPSTER Experiments with INQUERY," 1994, Information Processing and Management, vol. 31, Issue 3, pp. 327-343.

Cohen, Yossi, "Interpreter for FUF," (available at ftp://ftp.cs.bgu.ac.il/pub/people/elhadad/fuf-life.lf).

Mohri, M. and Riley, M., "An Efficient Algorithm for the N-Best-Strings Problem," 2002, Proc. of the 7th Int. Conf. on Spoken Language Processing (ICSLP'02), Denver, CO, pp. 1313-1316.

Nederhof, M. and Satta, G., "IDL-Expressions: A Formalism for Representing and Parsing Finite Languages in Natural Language Processing," 2004, Journal of Artificial Intelligence Research, vol. 21, pp. 281-287.

Och, F. and Ney, H., "Discriminative Training and Maximum Entropy Models for Statistical Machine Translation," 2002, Proc. of the 40th Annual Meeting of the ACL, Philadelphia, PA, pp. 295-302.

Resnik, P. and Smith, A., "The Web as a Parallel Corpus," Sep. 2003, Computational Linguistics, Special Issue on Web as Corpus, vol. 29, Issue 3, pp. 349-380.

Russell, S. and Norvig, P., "Artificial Intelligence: A Modern Approach," 1995, Prentice-Hall, Inc., New Jersey [redacted—table of contents].

Ueffing et al., "Generation of Word Graphs in Statistical Machine Translation," 2002, Proc. of Empirical Methods in Natural Language Processing (EMNLP), pp. 156-163.

Kumar, R. and Li, H., "Integer Programming Approach to Printed Circuit Board Assembly Time Optimization," 1995, IEEE Transactions on Components, Packaging, and Manufacturing.

* cited by examiner r-table

| original order | reordering | P(reorder) |
|---|---|---|
| PRP VB1 VB2 | PRP VB1 VB2 | 0.074 |
| | PRP VB2 VB1 | 0.723 |
| | VB1 PRP VB2 | 0.061 |
| | VB1 VB2 PRP | 0.037 |
| | VB2 PRP VB1 | 0.083 |
| | VB2 VB1 PRP | 0.021 |
| VB TO | VB TO | 0.251 |
| | TO VB | 0.749 |
| TO NN | TO NN | 0.107 |
| | NN TO | 0.893 |
| ... | | | n-table

| parent | TOP | VB | VB | VB | TO | TO | ... |
|---|---|---|---|---|---|---|---|
| node | — | VB | PRP | TO | TO | NN | ... |
| P(None) | 0.735 | 0.687 | 0.344 | 0.709 | 0.900 | 0.800 | ... |
| P(Left) | 0.004 | 0.061 | 0.004 | 0.003 | 0.003 | 0.096 | ... |
| P(Right) | 0.260 | 0.252 | 0.652 | 0.261 | 0.007 | 0.104 | ... | ins-w table

| w | P(ins-w) |
|---|---|
| ha | 0.219 |
| ta | 0.131 |
| wo | 0.099 |
| no | 0.094 |
| ni | 0.080 |
| te | 0.078 |
| ga | 0.062 |
| ... | ... |
| desu | 0.0007 |
| ... | ... | t-table

| E | adores | he | | i | | listening | | music | | to | |
|---|---|---|---|---|---|---|---|---|---|---|---|
| J | daisuki 1.000 | kare | 0.952 | NULL | 0.471 | kiku | 0.333 | ongaku | 0.900 | ni | 0.216 |
| | | NULL | 0.016 | watasi | 0.111 | kii | 0.333 | naru | 0.100 | NULL | 0.204 |
| | | nani | 0.005 | kare | 0.055 | mi | 0.333 | | | to | 0.133 |
| | | da | 0.003 | shi | 0.021 | | | | | no | 0.046 |
| | | shi | 0.003 | nani | 0.020 | | | | | wo | 0.038 |
| | | ... | | ... | | | | | | ... | |

*FIG. 4*

TRAINING TREE TRANSDUCERS FOR PROBABILISTIC OPERATIONS

This application claims the benefit of the priority of U.S. Provisional Application Ser. No. 60/553,587, filed Mar. 15, 2004 and entitled "TRAINING TREE TRANSDUCERS", the disclosure of which is hereby incorporated by reference.

BACKGROUND

Many different applications are known for tree transducers. These have been used in calculus, other forms of higher mathematics. Tree transducers are used for decidability results in logic, for modeling mathematically the theories of syntax direction translations and program schemata, syntactic pattern recognition, logic programming, term rewriting and linguistics.

Within linguistics, automated language monitoring programs often use probabilistic finite state transducers that operate on strings of words. For example, speech recognition may transduce acoustic sequences to word sequences using left to right substitution. Tree based models based on probabilistic techniques have been used for machine translation, machine summarization, machine paraphrasing, natural language generation, parsing, language modeling, and others.

A special kind of tree transducer, often called an R transducer, operates with its roots at the bottom, with R standing for "root to frontier". At each point within the operation, the transducer chooses a production to apply. That choice is based only on the current state and the current root symbol. The travel through the transducer continues until there are no more state annotated nodes.

The R transducer represents two pairs, T1 and T2, and the conditions under which some sequence of productions applied to T1 results in T2. This is similar to what is done by a finite state transducer.

For example, if a finite state transition from state q to state r eats symbol A and outputps symbol B, then this can be written as an R production of q(A x0)->B (r x0).

The R transducer may also copy whole trees, transform subtrees, delete subtrees, and other operations.

SUMMARY

The present application teaches a technique of training tree transducers from sample input/output pairs. A first embodiment trains the tree pairs, while a second embodiment trains the tree transducers based on tree/string pairs. Techniques are described that facilitate the computation, and simplify the information as part of the training process.

An embodiment is described which uses these techniques to train transducers for statistical based language processing: e.g. language recognition and/or language generation. However, it should be understood that this embodiment is merely exemplary, and the other applications for the training of the tree transducers are contemplated.

BRIEF DESCRIPTION OF THE DRAWINGS

These and other aspects will now be described in detail with reference to the accompanying drawings, wherein:

FIGS. 3 and 4 show a model and parameter table.

DETAILED DESCRIPTION

Figure 1:
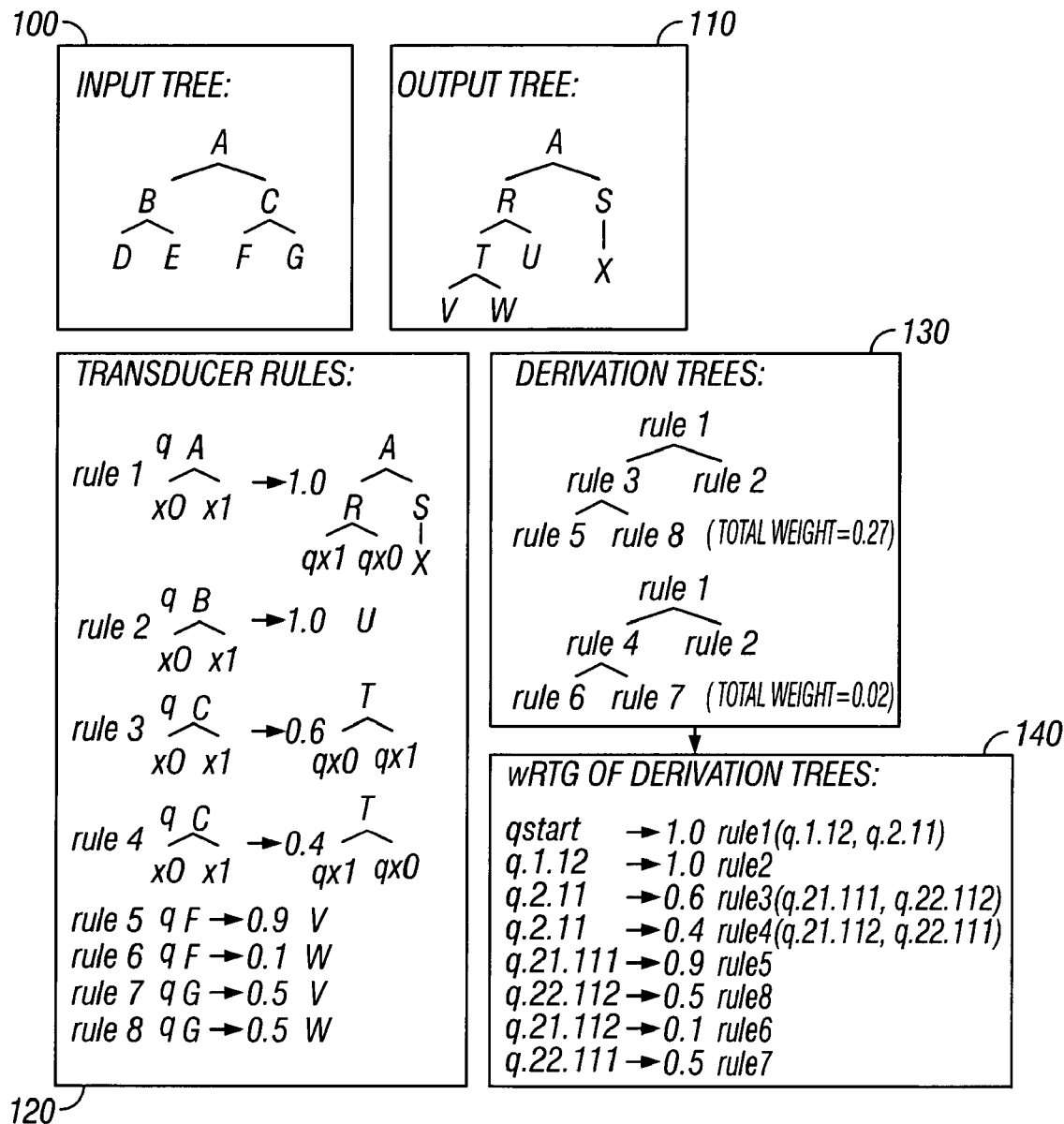
FIG. 1 shows derivation trees and their simplifications.

The present application describes training of tree transducers. The embodiment describes training of tree transducers, e.g., probabilistic R transducers. These transducers may be used for any probabilistic purpose. In an embodiment, the trained transducers are used for linguistic operations, such as machine translation, paraphrasing, text compression and the like. Training data may be obtained in the form of tree pairs. Linguistic knowledge is automatically distilled from those tree pairs and transducer information.

T$\Sigma$ represents the set of trees over the alphabet $\Sigma$. An alphabet is a finite set of symbols. Trees may also be written as strings over the set $\Sigma$.

A regular tree grammar or RTG allows compactly representing a potentially infinite set of trees. A weighted regular tree grammar is a set of values, where trees in the set have weights associated with them. The trees can be described as a quadruple G ($\Sigma$, N, S, P), where $\Sigma$ is the alphabet, and N is the set of non-terminals, S is the starting (initial) terminal, and P is the set of weighted productions. The productions are written left to right. A weighted RTG can accept information from an infinite number of trees. More generally, the weighted RTG can be any list which includes information about the trees in a tree grammar, in a way that allows the weight to change rather than a new entry each time the same information is reobtained.

The RTG can take the following form:

TABLE I $\Sigma$ = {S, NP, VP, PP, PREP, DET, N, V, run, the, of, sons, daughters}
N = {qnp, qpp, qdet, qn, qprep}
S = q
P = {q $\to^{1.0}$ S(qnp, VP(VB(run))),
    qnp $\to^{0.6}$ NP(qdet, qn),
    qnp $\to^{0.4}$ NP(qnp, qpp),
    qpp $\to^{1.0}$ PP(qprep, np),
    qdet $\to^{1.0}$ DET(the),
    qprep $\to^{1.0}$ PREP(of),
    qn $\to^{0.5}$ N(sons),
    qn $\to^{0.5}$ N(daughters)}

The tree is parsed from left to right, so that the leftmost non-terminal is the next one to be expanded as the next item in the RTG. The left most derivations of G build a tree pre-order from left to right according to $$LD(G) \equiv \{(t, ((p_1, r_1), \ldots, (p_n, r_n)) \in D_G | \forall 1 \leq i < n : p_{i+1} \not\ll_{lex} p_i\}$$

The total weight of t in G is given by $W_G : T_\Sigma \to \mathbb{R}$, the sum of leftmost den derivations producing t:

$$W_G(t) \equiv \sum_{(t,h) \in LD(G)} \prod_{i=1}^{n} w_i \text{ where}$$

$$h = (h_1, \ldots, h_n) \text{ and } h_i = (p_i, (l_i, r_i, w_i))$$

Therefore, for every weighted context free grammar, there is an equivalent weighted RTG that produces weighted derivation trees. Each weighted RTG is generated from exactly the recognizable tree language.

An extended transducer are is also used herein. According to this extended transducer xR, an input subtree matching pattern in state q is converted into its right hand side ("rhs"), and it's Q paths are replaced by their recursive transformations. The right hand side of these rules may have no states for further expansions (terminal rules) or may have states for further expansion. In notation form $$\Rightarrow x \equiv \left\{ ((a, h), (b, h \cdot (i, (q, \text{pattern}, rhs, w)))) \mid \right.$$

$$(q, \text{pattern}, rhs, w) \in R \wedge$$

$$i \in \text{paths}_a \wedge q = \text{label}_a(i) \wedge \text{pattern}(a \downarrow (i \cdot (1))) = 1 \wedge$$

$$b = a \left[ i \leftarrow rhs \left[ \begin{array}{c} p \leftarrow q'(a \downarrow (i \cdot (1) \cdot i')), \\ \forall \, p \in \text{paths}_{rhs} : \text{label}_{rhs}(p) = (q', i') \end{array} \right] \right] \right\}$$

where, b is derived from a by application of a rule (queue, pattern)->rhs to an unprocessed input subtree ai which is in state q.

Its output is replaced by the output given by rhs. Its non-terminals are replaced by the instruction to transform descendent input subtrees.

The sources of a rule r=(q, l, rhs, w)∈R are the input-paths in the rhs:

$$\text{sources}(rhs) \equiv \{i^1 \mid \exists p \in \text{paths}_{rhs}(Q \times \text{paths}), q^1 \in Q : \text{label}_{rhs}(p) = (q^1, i^{-1})\}$$

The reflexive, transitive closure of ⇒x is written ⇒*$_x$, and the derivations of X, written D(X), are the ways of transforming input tree I (with its root in the initial state) to an output tree O:

$$D(X) \equiv \{(I, O, h) \in T_\Sigma \times T_\Delta \times (\text{paths} \times P)^* \mid (Q_i(I)(\,)) \Rightarrow^*_x (O, h)\}$$

The leftmost derivations of X transform the tree-preorder from left to right (always applying a transformation rule to the state-labeled subtree furthest left in its string representation):

$$LD(X) \equiv \{(I, O, ((p_1, r_1), \ldots, (p_n, r_n)) \in D(X) \mid \forall 1 \leq i < n : p_{i+1} \not<_{lex} p_i\}$$

The total weight of (I, O) in X is; given by $W_X : T_\Sigma \times T_\Delta \to \mathbb{R}$, the sum of leftmost derivations transforming I to O:

$$W_X(I, O) \equiv \sum_{(I,O,h) \in LD(X)} \prod_{i=1}^{n} w_i \text{ where}$$

$$h = (h_1, \ldots, h_n) \text{ and } h_i = (p_i, (l_i, r_i, w_i))$$

The tree transducers operate by starting at an initial state root and recursively applying output generating rules until no states remain, so that there is a complete derivation. In this way, the information (trees and transducer information) can be converted to a derivation forest, stored as a weighted RTG.

Figure 2A:
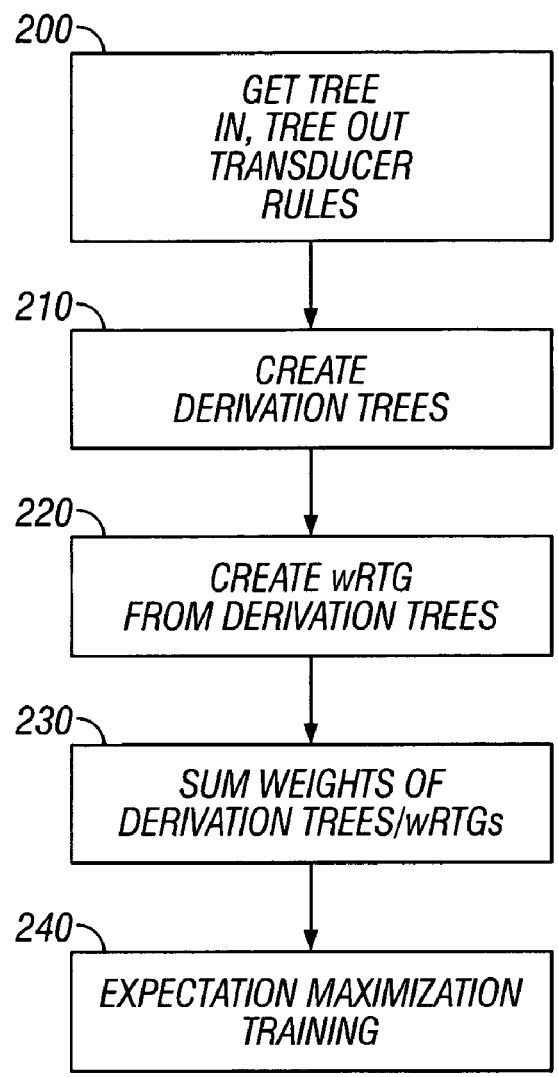
FIG. 2A shows a flowchart.
Figure 2B:
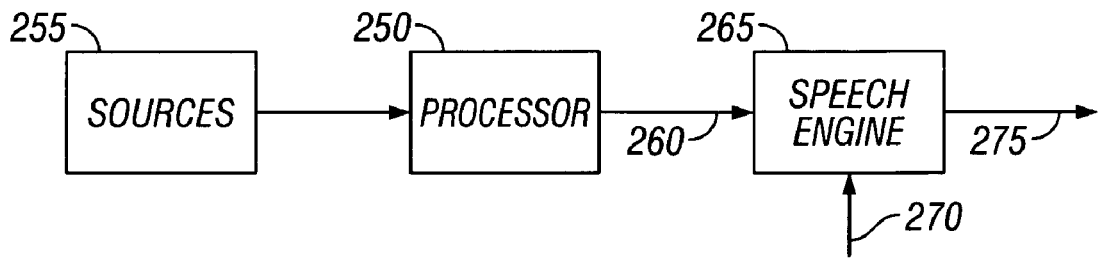
FIG. 2B shows a speech engine that can execute the flowchart of FIG. 2A.

The overall operation is illustrated in the flow chart of FIG. 2A; and FIG. 2B illustrates an exemplary hardware device which may execute that flowchart. For the application of language translation, a processing module 250 receives data from various sources 255. The sources may be the input and output trees and transducer rules described herein. Specifically, this may be the translation memories, dictionaries, glossaries, Internet, and human-created translations. The processor 250 processes this information as described herein to produce translation parameters which are output as 260. The translation parameters are used by language engine 265 in making translations based on input language 270. In the disclosed embodiment, the speech engine is a language translator which translates from a first language to a second language. However, alternatively, the speech engine can be any engine that operates on strings of words such as a language recognition device in speech recognition device, a machine paraphraser, natural language generator, modeler, or the like.

The processor 250 and speech engine 265 may be any general purpose computer, and can be effected by a microprocessor, a digital signal processor, or any other processing device that is capable of executing the steps described herein.

The flowchart described herein can be instructions which are embodied on a machine-readable medium such as a disc or the like. Alternatively, the flowchart can be executed by dedicated hardware, or by any known or later discovered processing device.

The system obtains a plurality of input and output trees or strings, and transducer rules with parameters. The parameters may then be used for statistical machine translation. More generally, however, the parameters can be used for any tree transformation task.

At 210, the input tree, output tree and tranducer rules are converted to a large set of individual derivation trees, "a derivation forest".

The derivation forest effectively flattens the rules into trees of depth one. The root is labeled by the original rule. All the non-expanding Δ labeled nodes of the rule are deterministically listed in order. The weights of the derivation trees are the products of the weights of the rules in those derivation trees.

FIG. 1 illustrates an input tree 100 being converted to an output tree 110 and generating derivation trees 130. FIG. 1 also shows the transducer rules 120. All of these are inputs to the system, specifically the input and output tree are the data that is obtained from various language translation resources 255, for example. The transducer rules are known. The object of the parsing carried out in FIG. 1 is to derive the derivation trees 130 automatically.

The input/output tree pairs are used to produce a probability estimate for each production in P, that maximizes the probability of the output trees given the input trees. The result is to find a local maximum. The present system uses simplifications to find this maximum.

The technique describes the use of memoization by creating the weighted RTG's. Memoization means that the possible derivations for a given produced combination are constant. This may prevent certain combinations from being computed more than once. In this way, the table, here the wRTG can store the answers for all past queries and return those instead of recomputing.

Note the way in which the derivation trees are converted to weighted RTG's. At the start, rule one will always be applied, so the first RTG represents a 1.0 probability of rule one being applied. The arguments of rule one are 1.12 and 2.11. If 1.12 is applied, rule 2 is always used, while 2.11 can be either rule 3 or rule 4, with the different weightings for the different rules being also shown.

At 230, the weighted RTG is further processed to sum the weights of the derivation trees. This can use the "inside-outside" technique, (Lari, et al, "The estimation of stochastic context free grammars using the inside-outside algorithm, Computer Speech and Language, 4, pp 35-36). The inside-outside technique observes counts and determines each time a rule gets used. When a rule gets used, the probability of that rule is increased. More specifically, given a weighted RTG with parameters, the inside outside technique enables computing the sums of weights of the trees derived using each production. Inside weights are the sum of all weights that can be derived for a non-terminal or production. This is a recursive definition. The inside weights for a production are the sum of all the weights of the trees that can be derived from that production.

$$\beta_G(n \in N) \equiv \sum_{(n,r,w) \in P} w \cdot \beta_G(r)$$

$$\beta_G(r \in T_\Sigma(N) \mid (n, r, w) \in P\} \equiv \prod_{p \in paths_r(N)} \beta_G(label_r(p))$$

The outside weights for a non-terminal are the sum of weights of trees generated by the weighted RTG that have derivations containing it but exclude its inside weights, according to $$\alpha_G(n \in N) \equiv$$

$$\begin{cases} 1 & \text{if } n = S \\ \overbrace{\sum_{p,(n',r,w) \in P: label_r(p)=n} w \cdot \alpha_G(n') \cdot}^{\text{uses of } n \text{ in productions}} \underbrace{\prod_{p' \in paths_r(N)-\{p\}} \beta_G(label_r(p'))}_{\text{sibling nonterminals}} & \text{otherwise.} \end{cases}$$

Estimation maximization training is then carried out at 240. This maximizes the expectation of decisions taken for all possible ways of generating the training corpus, according to expectation, and then maximization, as:

$$\forall\, p \in parameters: counts_p \equiv$$

$$E_{t \in training} \left[ \frac{\sum_{d \in derivations_t} (\# \text{ of times } p \text{ used in } d) \cdot weight_{parameters}(d)}{\sum_{d \in derivations_t} weight_{parameters}(d)} \right]$$

2. Maximizing by assigning the counts to the parameters and renormalizing:

$$\forall\, p \in parameters: p \leftarrow \frac{counts_p}{Z(p)}$$

Each iteration increases the likelihood until a local maximum is reached.

The step 230 can be written in pseudocode as:

For each $(i, o, w_{example}) \in T$ : // Estimate i. Let $D \equiv d_{i,o}$ ii. compute $\alpha_D, \beta_D$ using latest $W$ // inside-outside weights iii. For each $prod = (n, rhs, w) \in P : label_{rhs}(()) \in R$ in derivation $wRTG\ D = (R, N, S, P)$:

A. $\gamma_D(prod) \leftarrow \alpha_G(n) \cdot w \cdot \beta_G(rhs)$

B. Let $rule \equiv label_{rhs}(())$

C. $count_{rule} \leftarrow count_{rule} + w_{example} \cdot \frac{\gamma_D(prod)}{\beta_D(S)}$ iv. $L \leftarrow L + \log \beta_D(S) \cdot w_{example}$ For each $r = (q, pattern, rhs, w) \in R$ : // Maximize i. $w_r \leftarrow \frac{count_r}{Z(counts, r)}$ $$\delta \leftarrow \frac{L - lastL}{|L|}$$

$lastL \leftarrow L, itno \leftarrow itno + 1$

By using the weighted RTG's, each estimation maximum iteration takes an amount of time that is linear to the size of the transducer. For example, this may compute the sum of all the counts for rules having the same state, to provide model weights for a joint probability distribution of the input output tree pairs. This joint normalization may avoid many different problems.

Figure 2C:
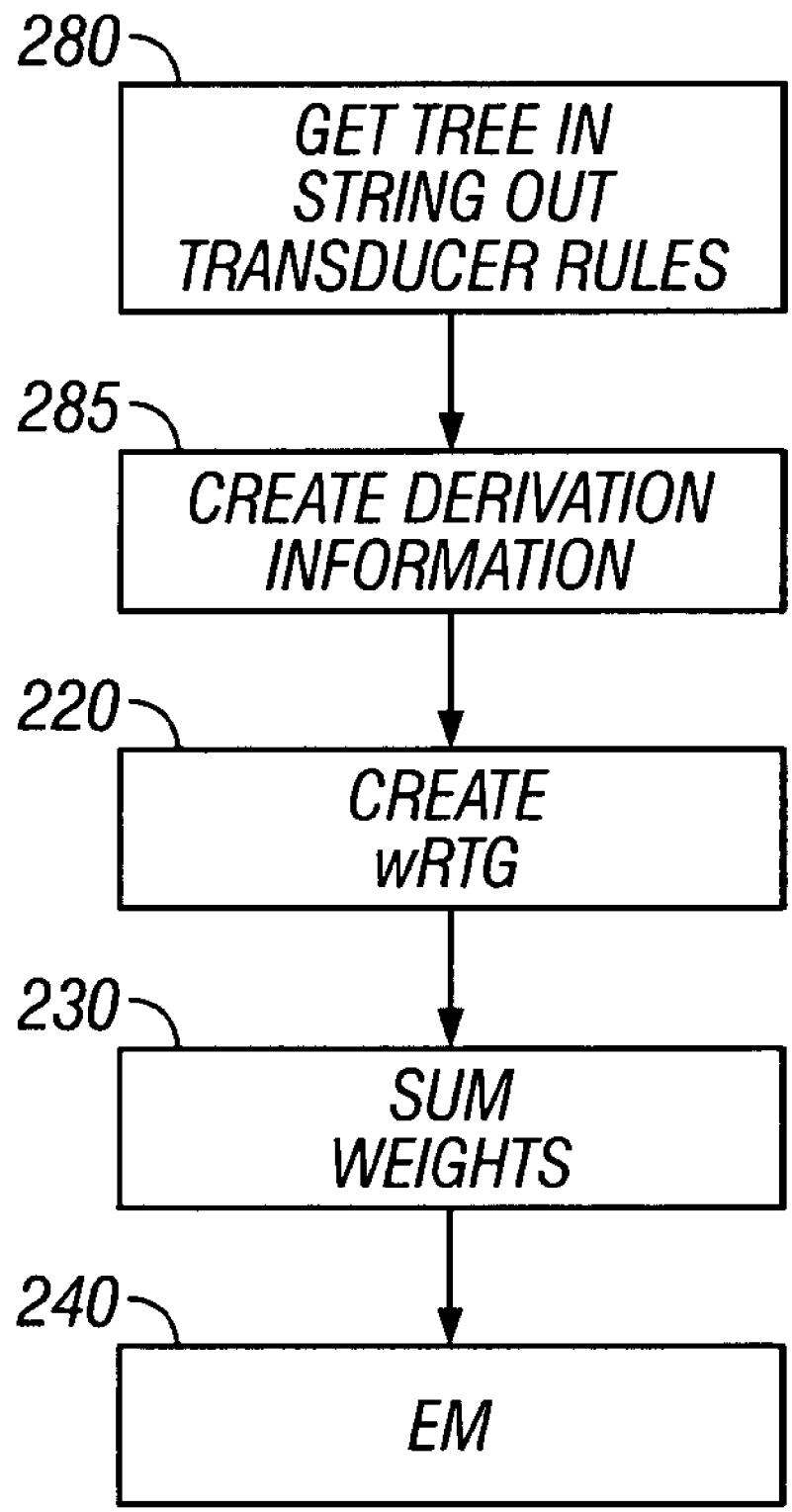
FIG. 2C shows a flowchart of a second embodiment.

The above has described tree-to-tree transducers. An alternative embodiment describes tree to string transducers is shown in the flowchart of FIG. 2C. This transducer will be used when a tree is only available at the input side of the training corpus. Note that FIG. 2C is substantially identical to FIG. 2A other than the form of the input data.

The tree to string transduction is then parsed using an extended R transducer as in the first embodiment. This is used to form a weighted derivation tree grammar. The derivation trees are formed by converting the input tree and the string into a flattened string of information which may include trees and strings. 285 of FIG. 5c simply refers to this as derivation information. The parsing of the tree to string transduction may be slightly different then the tree to tree transduction. Instead of derivation trees, there may be output string spans. A less constrained alignment may result.

This is followed in FIG. 2C by operations that are analogous to those in FIG. 2A: specifically, creation of the weighted RTG, the same as the weight summing of 230 and the expectation maximization of 240.

EXAMPLE

An example is now described here in of how to cast a probabilistic language model as an R transducer.

Table 2 shows a bilingual English tree Japanese string training corpus.

TABLE 2

| | |
|---|---|
| ENGLISH: | (VB (NN hypocrisy) |
| | (VB is) |
| | (JJ (JJ abhorrent) |
| | (TO (TO to) (PRP them)))) |
| JAPANESE: | kare ha gizen ga daikirai da |
| ENGLISH: | (VB (PRP he) |
| | (VB has) |
| | (NN (JJ unusual) (NN ability)) |
| | (IN (IN in) (NN english))) |
| JAPANESE: | kare ha eigo ni zubanuke-ta sainou wo mot-te iru |
| ENGLISH: | (VB (PRP he) |
| | (VB was) |
| | (JJ (JJ ablaze) |
| | (IN (IN with) (NN anger)))) |
| JAPANESE: | kare ha mak-ka ni nat-te okot-te i-ta |
| ENGLISH: | (VB (PRP i) |
| | (VB abominate) |
| | (NN snakes)) |
| JAPANESE: | hebi ga daikirai da |
| etc. | |

Figure 3:
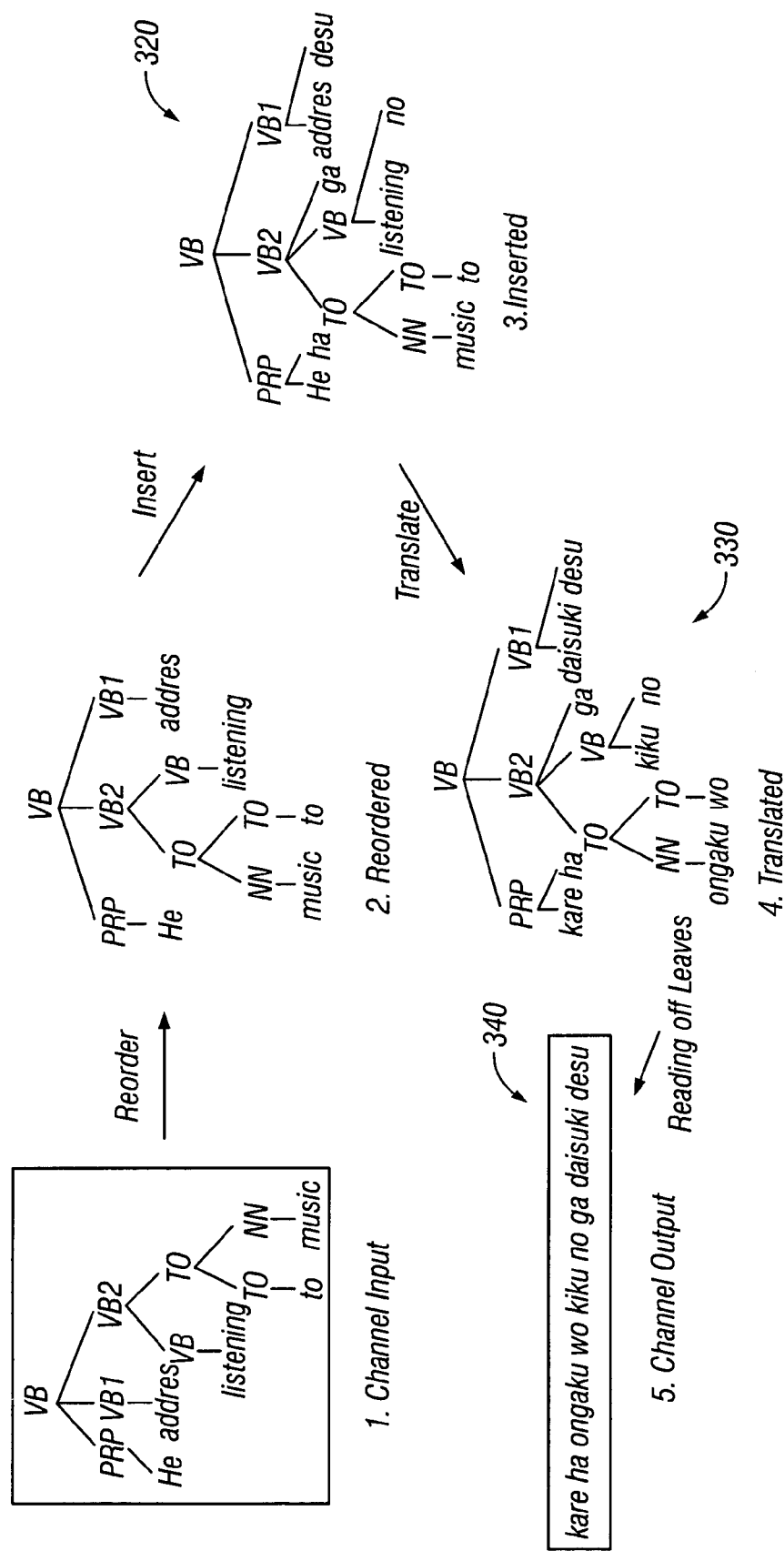

FIGS. 3 and 4 respectively show the generative model and its parameters. The parameter values that are shown are learned via expectation maximization techniques as described in Yamada and Knight 2001.

According to the model, an English tree becomes a Japanese string in four operations. FIG. 3 shows how the channel input is first reordered, that is its children are permeated probabilistically. If there are three children, then there are six possible permutations whose probabilities add up to one. The reordering is done depending only on the child label sequence.

In 320, a decision is made at every node about inserting a Japanese function word. This is a three-way decision at each node, requiring determination of whether the word should be inserted to the left, to the right, or not inserted at all. This insertion technique at 320 depends on the labels of the node and the parent. At 330, the English leaf words are translated probabilistically into Japanese, independent of context. At 340, the internal nodes are removed, leaving only the Japanese string.

This model can effectively provide a formula for

P. (Japanese string|English tree)

in terms of individual parameters. The expectation maximization training described herein seeks to maximize the product of these conditional probabilities based on the entire tree-string corpus.

First, an xRs tree to string transducer is built that embodies the probabilities noted above. This is a four state transducer. For the main-start state, the function q, meaning translate this tree, has three productions:

q x→i x, r x
q x→r x, i x
q x→r x

State 5 means "produce a Japanese word out of thin air." There is an i production for each Japanese word in the vocabulary.

i x→"de"
i x→"kuruma"
i x→"wa"
...

State r means "reorder my children and then recurse". For internal nodes, this includes a production for each parent/child sequence, and every permutation thereof:

r NN(x0:CD, x1:NN)→q x0, q x1
r NN(x0:CD, x1:NN)→q x1, q x0
...

The RHS then sends the child subtrees back to state q for recursive processing. For English leaf nodes, the process instead transitions to a different state t to prohibit any subsequent Japanese function word insertion:

r NN(x0:"car")→t x0
r CC (x0:"and")→t x0
...

State t means "translate this word". There is a production for each pair of cooccuring in English and Japanese words.

t "car"→"kuruma"
t "car"→*wa*
t "car"→*e*
...

Each production in the XRS transducer has an associated weight, and corresponds to exactly 1 of the model parameters.

The transducer is unfaithful in one respect, specifically the insert function word decision is independent of context. It should depend on the node label and the parent label. This is addressed by fixing the q and r production. Start productions are used:

q x:VB→q.TOP.VB x
q x:JJ→q.TOP.JJ x
...

States are used, such as q.top.vb which states mean something like "translate this tree, whose route is vb". Every parent-child payer in the corpus gets its own set of insert function word productions:

q.TOP.VB x→i x, r x
q.TOP.VB x→r x, i x
q.TOP.VB x→r x
q.VB.NN x→i x, r x
q.VB.NN x→r x, i x
q.VB.NN x→r x
...

Finally, the R productions need to send parent child information when they recurse to the q.parent.child states.

The productions stay the same. Productions for appraisal translations and others can also be added.

Although only a few embodiments have been disclosed in detail above, other modifications are possible, and this disclosure is intended to cover all such modifications, and most particularly, any modification which might be predictable to a person having ordinary skill in the art. For example, an alternative embodiment could use the same techniques for string to string training, based on tree based models or based only on string pair data. Another application is to generate likely input trees from output trees or vide versa. Also, and to reiterate the above, many other applications can be carried out with tree transducers, and the application of tree transducers to linguistic issues is merely exemplary.

Also, only those claims which use the words "means for" are intended to be interpreted under 35 USC 112, sixth paragraph. Moreover, no limitations from the specification are intended to be read into any claims, unless those limitations are expressly included in the claims All such modifications are intended to be encompassed within the following claims

What is claimed is:

1. A method for performing probabilistic operations with trained tree transducers, the method comprising:
    through execution of instructions stored in memory, obtaining tree transducer information including input/output pair information and transducer information;
    through execution of instructions stored in memory, converting said input/output pair information and said transducer information into a set of values in a weighted tree grammar; and
    through execution of instructions stored in memory, using said weighted tree grammar to solve a problem that requires information from the input/output pair information and transducer information.

2. A method as in claim 1, wherein said tree transducer information includes an input tree and an output tree as said input/output pair.

3. A method as in claim 1, wherein said tree transducer information includes an input tree and an output string as said input/output pair.

4. A method as in claim 1, further comprising, through execution of instructions stored in memory, converting said tree transducer information into a derivation forest.

5. A method as in claim 1, wherein said training further comprises maximizing an expectation of decisions.

6. A method as in claim 1, wherein said using comprises training a linguistic engine which solves a linguistic problem.

7. A method as in claim 6, wherein said linguistic problem includes training of a linguistic engine of a type that converts from one language to another.

8. A method as in claim 1, wherein said set of values represents information about the tree transducer information and transducer information in a specified grammar, associated with a weight for each of a plurality of entries.

9. A method as in claim 8, wherein said set of values are in a weighted regular tree grammar.

10. A method as in claim 9, wherein said converting comprises storing the set of values as a weighted regular tree grammar, and returning certain stored information instead of recomputing said certain stored information.

11. A method as in claim 1, further comprising, through execution of instructions stored in memory, further processing the set of values to sum weights based on information learned from said tree transducer information and said transducer information.

12. A method as in claim 11, wherein said further processing comprises using an inside-outside algorithm to observe counts and determine each time a rule gets used and to adjust said rule weights based on said observing.

13. A method as in claim 11, wherein said further processing comprises observing counts and determining each time a rule gets used, and increasing a probability of that rule each time the rule gets used.

14. A method as in claim 1, wherein said training further comprises computing a sum of all the counts for rules having the same state, to provide model weights for one of a joint or conditional probability distribution of the tree transducer information.

15. A method as in claim 1, wherein said using comprises solving a logic problem.

16. A method as in claim 15, wherein said logic problem is a problem that uses a machine to analyze and the aspect of at least one language.

17. A method for training tree transducers for probabilistic operations, the method comprising:
using a computer to obtain information in the form of a first-tree, second information corresponding to said first tree, and transducer information; and
using said computer to automatically distill information from said first tree, from said second information, and from said transducer information into a list of information in a specified tree grammar with weights associated with entries in the list and to produce locally optimal weights for said entries.

18. A method as in claim 17, wherein said automatically distill comprises observing when a specified rule in said list of information is used, and increasing said weight associated with said specified rule when said specified rule is used.

19. A method as in claim 17, further comprising using said list of information in said computer to solve a problem.

20. A method as in claim 19, wherein said problem is a linguistic problem.

21. A method as in claim 17, wherein said automatically distill comprises parsing the information from a first portion to a second portion.

22. A method as in claim 21, wherein said second information comprises a second tree.

23. A method as in claim 21, wherein said second information comprises a string.

* * * * *